H. A. FISHER.
FASTENER FOR PANEL CABINETS.
APPLICATION FILED JAN. 5, 1912.
1,051,948.
Patented Feb. 4, 1913.
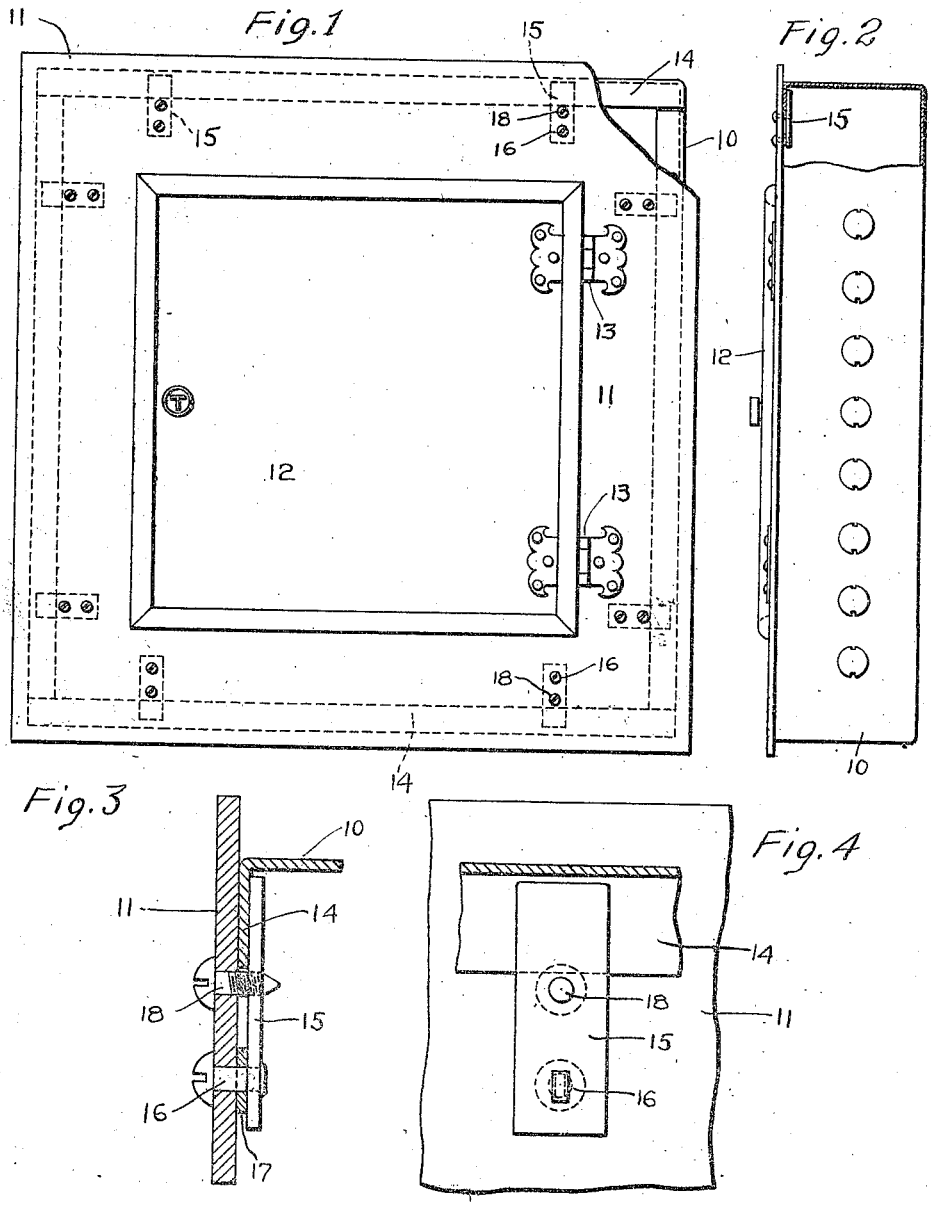

UNITED STATES PATENT OFFICE.

HARRY A. FISHER, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

FASTENER FOR PANEL-CABINETS.

1,051,948.  Specification of Letters Patent.  Patented Feb. 4, 1913.

Application filed January 5, 1912. Serial No. 869,697.

*To all whom it may concern:*

Be it known that I, HARRY A. FISHER, a citizen of the United States, residing at Plainville, county of Hartford, State of Connecticut, have invented an Improvement in Fasteners for Panel-Cabinets, of which the following is a specification.

This invention relates to panel cabinets, so called, that is cabinets adapted for insertion in a wall for receiving switches, fuses and other appliances used in making, centralizing and controlling electrical circuits and connections, and the invention has for its object to provide a simple and efficient fastening device so constructed that the cover carrying the door of a panel cabinet may be easily and quickly secured in place, reversed or removed, thus providing that the door may open either toward the right or left, as preferred, and also doing away with the necessity for setting the cabinet plumb. As cabinets of this character have heretofore been constructed, the covers were not adjustable relatively to the box and as they were attached in place after the latter was inserted in the wall, it has been necessary to use great care in setting the box so that the cover when attached would be practically plumb. Another difficulty has been that the boxes were apt to get more or less battered and sprung out of shape in shipment so that the screw holes in cover and box would not line up.

My present invention does away with the above objections and provides a cabinet of the character described having an adjustable cover which may be used either side up so that the door will open either toward the right or left and which renders special care in setting the box in the wall unnecessary as squaring up is simply necessary in attaching the cover to the box after the latter is in place.

In the accompanying drawing forming a part of this specification, Figure 1 is a front elevation of my novel cabinet as in use, the cover being partly broken away; Fig. 2 an elevation as seen from the right in Fig. 1; Fig. 3 an enlarged detail sectional view illustrating the mode of attaching the cover to the box; and Fig. 4 is an elevation as seen from the right in Fig. 3.

10 denotes the box and 11 the cover which is provided with a door 12 hinged as at 13 and provided with a suitable lock or catch. The essential feature of the invention is that the edges of the box are provided with flanges 14 which may be turned either inward or outward at right angles to the sides of the box but are preferably turned inward as shown in the drawing. The cover is attached to the box by means of clamping plates 15 which are pivoted on the inner side of the cover, preferably by means of studs 16 which are rigidly secured in the plate and turn in the cover, washers 17 being interposed between the plates and the cover and the heads of the studs being slotted to receive a screw driver by which the studs and plates may be turned from the outside. The plates are locked in place by screws 18 which pass through the cover and engage the plates and act to clamp them down upon the flanges of the box.

In use, having set the box in the wall the screws are turned out from the clamping plates, the plates are turned so as to clear the flanges of the box, then the cover is set in place over the box, the clamping plates are turned over the flanges, as shown, after which one of the clamping screws is inserted and the plate is clamped down upon the flange. The cover is then squared up, after which the rest of the screws are turned in and all the plates are clamped down upon the flanges of the box, locking the cover securely in place. Any number of clamping plates may be used. In the present instance I have shown two clamping plates upon each edge of the cover.

Having thus described my invention I claim:

1. The combination with a box having an open end provided with a flange, a cover adapted to be seated on said flange to close the open end of the box, a pivot extending through and rotatable in the cover, a clamping plate having one end rigidly fastened to the inner end of the pivot and adapted to engage the said flange, said pivot having its outer end provided with means whereby it may be rotated from the exterior of the box to engage the plate with the said flange, and clamping means operable from the exterior of the box and engaging the free end of said clamping plate to bring the latter into clamping engagement with the flange.

2. The combination with a box having an open end provided with a flange, a cover adapted to be seated on the flange, pivots extending through and rotatable in the cover, the ends of the pivots projecting beyond opposite sides of the cover, clamping plates each rigidly fastened at one end to the inner ends of one of said pivots, the outer ends of the pivots being provided with slotted heads whereby the pivots may be rotated to engage the plates with the flange, and clamping screws extending through and operable from the outer side of the cover for engaging the free ends of said clamping plates to bring the latter into clamping engagement with the flange, said clamping screws being provided with exterior slotted heads whereby they may be operated.

In testimony whereof I affix my signature in presence of two witnesses.

HARRY A. FISHER.

Witnesses:
C. D. PLATT,
J. S. CLINTON.